United States Patent [19]

Oka et al.

[11] Patent Number: 5,640,140
[45] Date of Patent: Jun. 17, 1997

[54] ALARM PROCESSING APPARATUS

[75] Inventors: Akihiko Oka; Kanta Yamamoto, both of Kawasaki, Japan

[73] Assignee: Fujitsu Limited, Kanagawa, Japan

[21] Appl. No.: 298,046

[22] Filed: Aug. 30, 1994

[30] Foreign Application Priority Data

Mar. 15, 1994 [JP] Japan ................. 6-044118

[51] Int. Cl.⁶ ........................... G08B 29/00
[52] U.S. Cl. ............ 340/506; 340/508; 340/511; 340/825.06; 340/933
[58] Field of Search .................. 340/526, 508, 340/511, 507, 825.06, 825.16

[56] References Cited

U.S. PATENT DOCUMENTS

| | | | |
|---|---|---|---|
| 4,853,685 | 8/1989 | Vogt | 340/506 |
| 4,956,637 | 9/1990 | Vogt | 340/506 |

FOREIGN PATENT DOCUMENTS

1069126  3/1989  Japan ................. 340/506

Primary Examiner—Jeffery Hofsass
Assistant Examiner—Daryl C. Pope
Attorney, Agent, or Firm—Helfgott & Karas, PC

[57] ABSTRACT

The alarm processing apparatus has fault detection means which detect faults with regard to specific individual items, and which are provided in constituent elements, which have redundancy; fixed fault detection means which determine the individual frequencies of occurrence of the faults detected by the fault detection means and which detect fixed faults related to the individual items, based on the relative magnitude of the frequencies with respect to the allowable maximum fault occurrence frequencies for those items; and selection means which by means of a system configuration command and at a timing which is delayed to longer than the response time of the fixed fault detection means, outputs an alarm for either the faults detected by the fault detection means in response to the system configuration command or the fixed faults detected by the fixed fault detection means.

2 Claims, 7 Drawing Sheets

Fig.7

ALARM PROCESSING APPARATUS

BACKGROUND OF THE INVENTION

1. Field of the Invention

The present invention is related to an alarm processing apparatus in a system having a standby redundancy, in which specific items are individually monitored, with identification being made with respect to one-time faults or dispersed fixed faults.

2. Description of the Related Art

In systems such as a transmission system, a banking system, or a seat reservation system, it is necessary for the system to have high reliability, matched to the operating mode and conditions. In these systems, to achieve the functions required by the system, extra constitutional elements or means (hereafter simply called units) which are considered essential are provided beforehand, with continuous operation maintained by successive reconfiguration of the system by elimination of faulty units.

In such a redundant system, there is an active type of redundancy, such as in the case of a dual configured system, in which redundant units continue to maintain mutual monitoring, with parallel operation as long as they are operating normally, but with automatic separation of a unit which is judged to be faulty, and standby redundancy, such as in a duplex (hot-standby) configured system, in which if the currently in-service unit of the redundant units fails, one of the standby units is switched in.

However, in a transmission system, in the case of active redundancy, because the reliable mutual verification of the operating conditions of the units not only requires special logic, but is also expensive, it is difficult to apply. Because of this, the n+1 spare or above-described duplex system of redundancy is often used. Also, such as system is configured with a number of unmanned stations which are installed at geographically separated locations.

In a transmission system provided in such an unmanned station, although one-time or dispersed faults caused by misoperation due to induction from lightning, improper synchronization because of variation in the quality of the transmission path, or operational errors in performing remote control will be successively detected by an alarm detection section, an alarm signal indicating a fixed fault will not be included. Therefore, it is possible to perform highly accurate maintenance on only unmanned stations judged as having fixed faults, thereby enhancing the efficiency of maintenance and operation.

In such an alarm processing apparatus as this, in the case in which a unit in service fails and the standby unit is switched to be the in-service unit, an inhibit circuit that inhibits the passage of such an alarm signal in response to the corresponding system configuration signal transmits the alarm signal given by the output of an alarm processing circuit to the subsequent stage. However, because the connection between the transmission path and the signal termination section of the standby unit is broken by means of the standby relay 722, a pseudo fixed fault which actually has not occurred will be indicated until the alarm detection section and alarm processing circuit make a response with respect to the restoration of the connection.

SUMMARY OF THE INVENTION

The present invention has as an object the provision of an alarm processing apparatus which achieves alarm signals with good correlation to the actual operation conditions, in response to the reconfiguration of the system.

According to the present invention, there is provided an alarm processing apparatus, comprising: fault detection means, which monitor specific items and detect faults based on criteria which are suited to the items, and which are provided in constituent elements, which have standby redundancy and which also have an operating mode which is set in accordance with a system configuration command based on said standby redundancy; fixed fault detection means which determine the individual frequencies of occurrence of the faults detected by the fault detection means and which detect fixed faults related to individual items, based on the relative magnitude of the frequencies with respect to the allowable maximum fault occurrence frequencies for the items; and selection means, which by means of a system configuration command and at a timing which is delayed to longer than the response time of the fixed fault detection means, outputs an alarm for either the faults detected by the fault detection means in response to the system configuration command or the fixed faults detected by the fixed fault detection means.

According to the present invention, the alarm processing apparatus further has start control means, which perform individual monitoring of the operating modes of the constituent elements based on a system configuration command, and perform a restart of the fault detection means when this operating mode switches to the non-standby mode.

Further, according to the present invention, there is provided an alarm processing apparatus, comprising: fault detection means, which monitor specific items and detect faults based on criteria which are suited to the items, and which are provided individually to constituent elements which have standby redundancy, the operating mode of the constituent elements being set in response to a system configuration command based on the redundancy; and alarm sending means which determine the individual frequencies of occurrence of the faults detected by fault detection means and which output alarms which indicate fixed faults related to individual items, based on the relative magnitude of the frequencies of occurrence with respect to the allowable maximum fault occurrence frequencies for those items, reduces the maximum fault frequency, wherein the alarm sending means is provided with processing expediting means whereby the maximum frequencies of occurrence when the operating mode set by the system configuration command in the standby mode are individually reduced, and further whereby the completion of the determination of frequency of occurrence is expedited.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1:
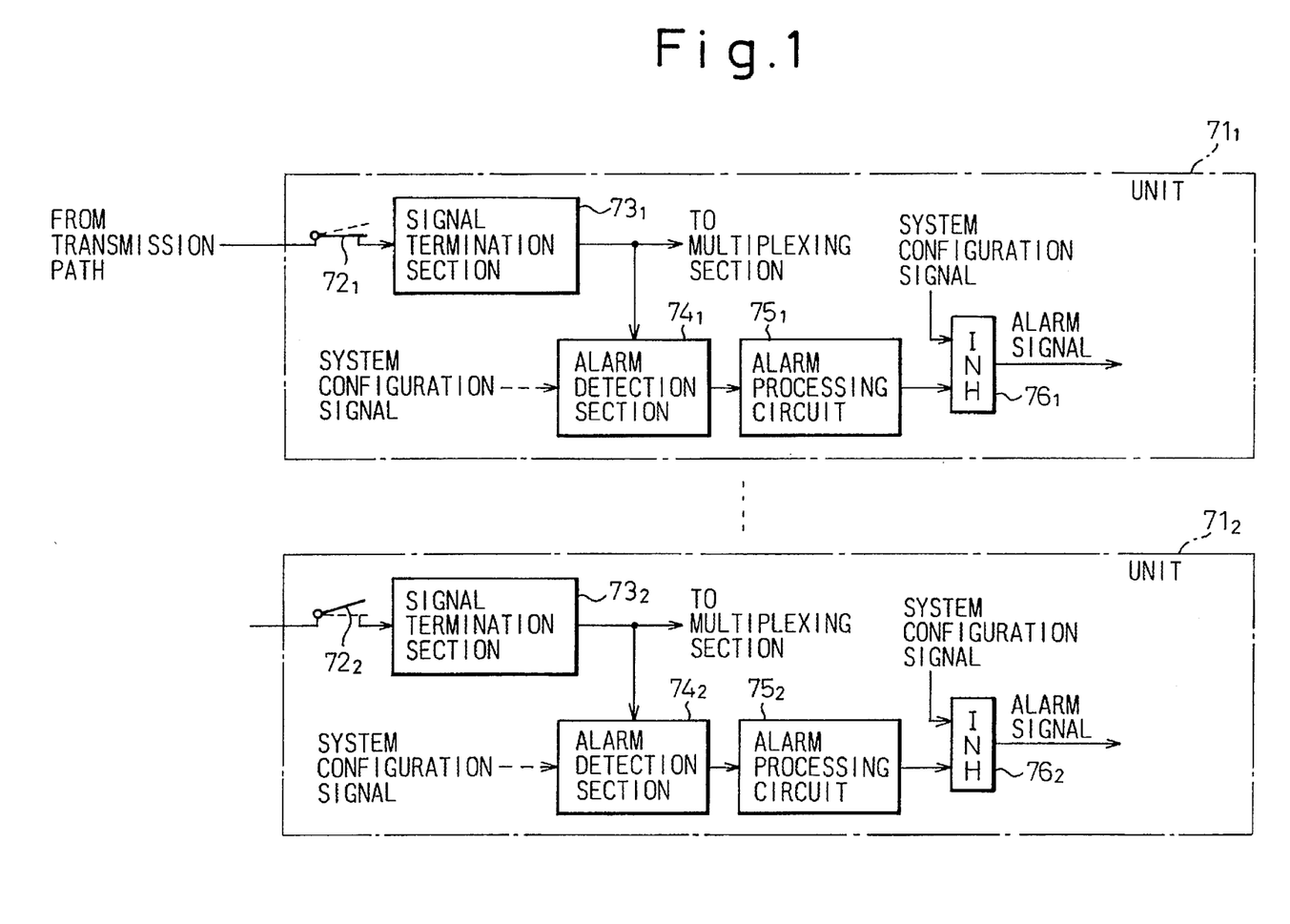
FIG. 1 is a drawing which shows an example of the configuration of an unmanned station to which standby redundancy is applied.

Before describing the preferred embodiments according to the present invention, examples of the related art are provided with reference to FIG. 1.

FIG. 1 is a drawing which shows an example of the configuration of an unmanned station in which standby redundancy has been applied.

In this drawing, units $71_1$ and $71_2$ are connected to a specific transmission path. At unit $71_1$ such a specific transmission system is connected to a multiplexing section (not shown in the drawing) via the relay $72_1$ and the signal termination section $73_1$, the output of this signal termination section $73_1$ being in turn connected to the inhibit circuit $76_1$ via the alarm detection section $74_1$ and the alarm processing circuit $75_1$. At the control input of the inhibit circuit $76_1$ is connected the system configuration signal from a control device (not shown in the drawing), an alarm signal being obtained at the output of the inhibit circuit $76_1$. Further, with regard to the configuration of unit $71_2$, because this has the same configuration as unit $71_1$, the reference symbols for each of its constituent elements has a suffix of "$_2$" and the explanation of these has been omitted herein.

In such an unmanned station, the contacts of relays $72_1$ and $72_2$ are opened and closed in accordance with the above-described system configuration signal. As a simplification, in the description which follows, unit $71_1$ is taken as the in-service unit and unit $71_2$ is taken as the standby spare unit.

In this condition, the contacts of relay $72_1$ are closed and the contacts of relay $72_2$ are open. At unit $71_1$, the signal termination section $73_1$ captures the signal received from the above-described specific transmission path via relay $72_1$, and applies this to the subsequent multiplexing section and alarm detection section $74_1$. The alarm detection section $74_1$ captures the thus-applied signal and monitors essential operation of the transmission path and unit $71_1$ against pre-established criteria. The alarm processing circuit $75_1$ integrates the results of the monitoring by means of the required calculation method and generates and outputs an alarm signal which indicates the existence or non-existence of a fixed fault. The inhibit circuit $76_1$, in response to the above-described system configuration signal, applies this alarm signal to the subsequent alarm circuit (not shown in the drawing).

At unit $71_2$, because the contacts of relay $72_2$ are open, the signal captured from the above-described specific transmission path is not applied to the signal termination section $73_2$. Therefore, the alarm detection section $74_2$ performs monitoring based on the above-described criteria, the judgment being made that unit $71_2$ has a fault and further the alarm processing circuit $75_2$ performs the above-described integration of the results of that judgment and outputs an alarm signal which indicates that a fixed fault has occurred. However, because the inhibit circuit $76_2$ inhibits the passage of such an alarm signal in response to the above-described system configuration signal, an alarm signal is obtained which indicates an apparent normal condition.

That is, in a transmission system provided in such an unmanned station, although one-time or dispersed faults caused by misoperation due to induction from lightning, improper synchronization because of variation in the quality o the transmission path, or operational errors in performing remote control will be successively detected, an alarm signal indicating a fixed fault will not be included. Therefore, it is possible to perform highly accurate maintenance on only unmanned stations judged as having fixed faults, thereby enhancing the efficiency of maintenance and operation.

In such an alarm processing apparatus as this, in the case in which the unit $71_1$ fails and the standby unit $71_2$ is switched to be the in-service unit, the inhibit circuit $76_2$, in response to the corresponding system configuration signal transmits the alarm signal given by the output of the alarm processing circuit $75_2$ to the subsequent stage. However, because the connection between the transmission path and the signal termination section $73_2$ is broken by means of the standby relay $72_2$, a pseudo fixed fault which actually has not occurred will be indicated until the ads $74_2$ and alarm processing circuit $75_2$ make a response with respect to the restoration of the connection.

Figure 2:
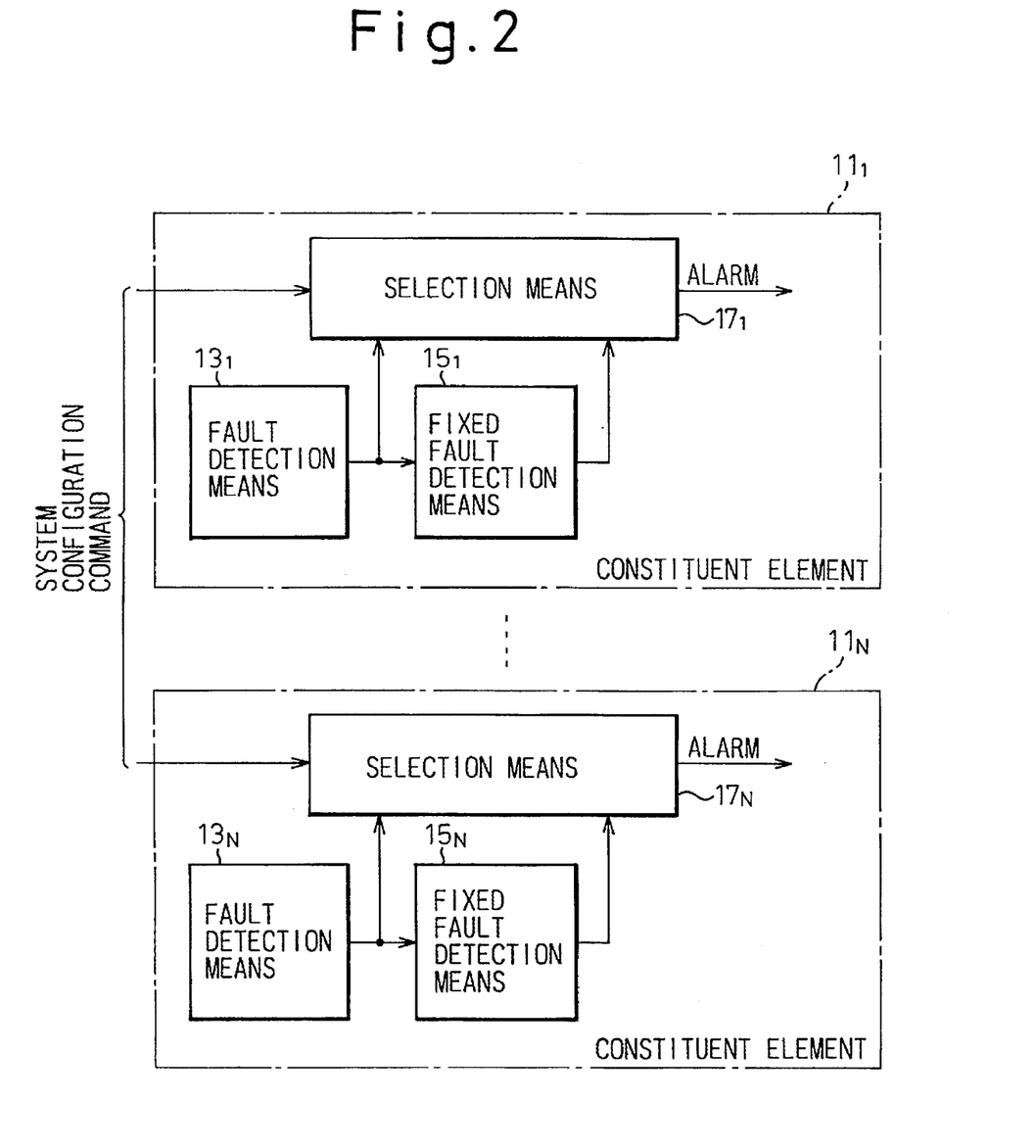
FIG. 2 is a block diagram which shows the first basic configuration of the invention.

FIG. 2 is a block diagram which shows the first basic configuration of the invention.

The first basic configuration has fault detection means $13_1$ to $13_N$, which monitor specific items and detect faults based on criteria which are suited to the items, and which are provided in constituent elements $11_1$ to $11_N$, which have standby redundancy and which also have an operating mode which is set in accordance with a system configuration command based on this standby redundancy, fixed fault detection means $15_1$ to $15_N$ which determine the individual frequencies of occurrence of the faults detected by fault detection means $13_1$ to $13_N$ and which detect fixed faults related to individual items, based on the relative magnitude of the frequencies with respect to the allowable maximum fault occurrence frequencies for those items, and selection means $17_1$ to $17_N$, which by means of a system configuration command and at a timing which is delayed to longer than the response time of the fixed fault detection means $15_1$ to $15_N$, outputs an alarm of for either the faults detected by the fault detection means $13_1$ to $13_N$ in response to the system configuration command or the fixed faults detected by the fixed fault detection means $15_1$ to $15_N$.

Figure 3:
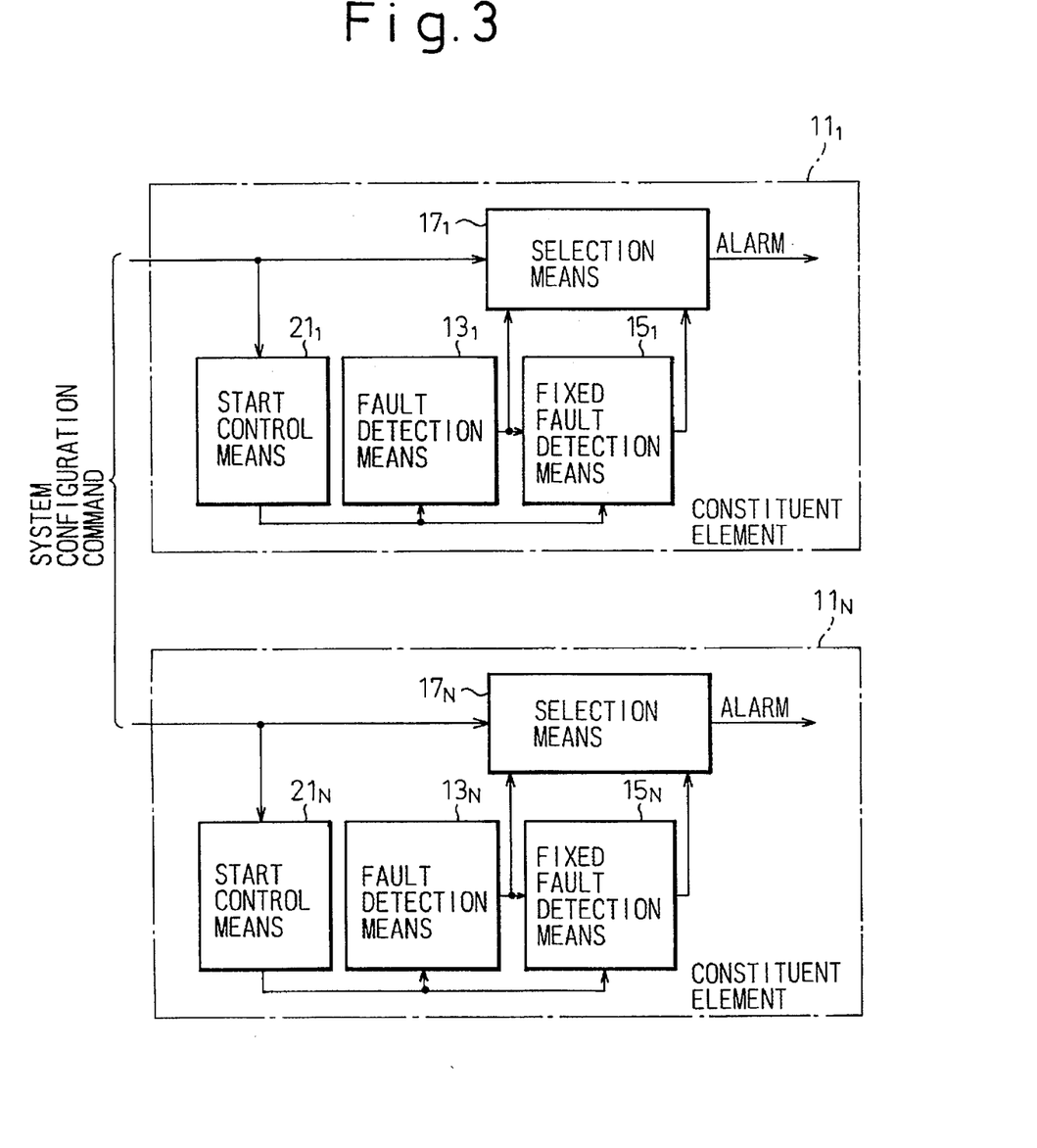
FIG. 3 is a block diagram which shows the second basic configuration of the invention.

FIG. 3 is a block diagram which shows the second basic configuration of the invention.

The second basic configuration further has start control means $21_1$ to $21_N$, which perform individual monitoring of the operating modes of the constituent elements $11_1$ to $11_N$ based on a system configuration command, and perform a restart of the fault detection means $13_1$ to $13_N$ when this operating mode switches to the non-standby mode.

Figure 4:
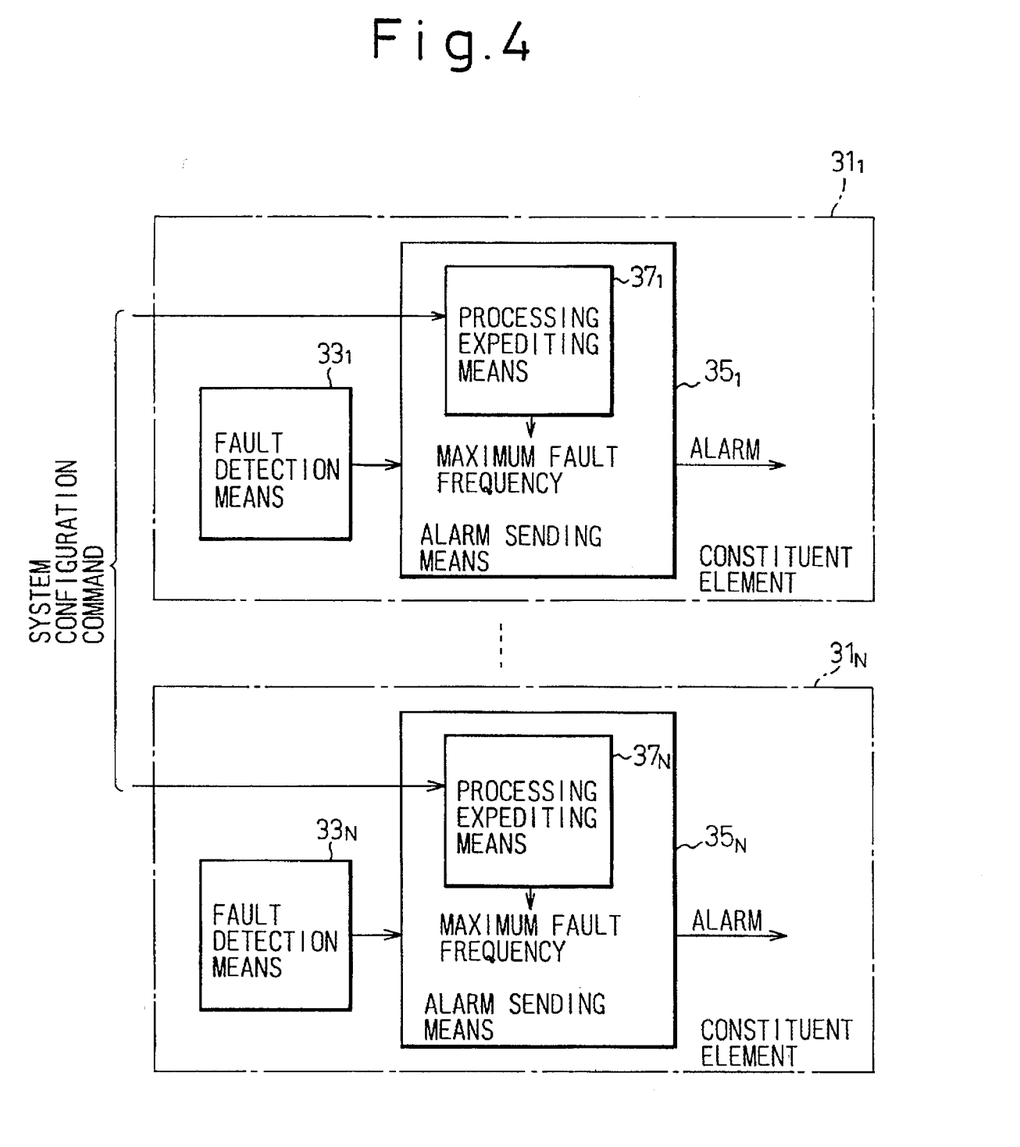
FIG. 4 is a block diagram which shows the third basic configuration of the invention.

FIG. 4 is a block diagram which shows the third basic configuration of the invention.

The third basic configuration has processing expediting means $37_1$ to $37_N$ which, in an alarm processing apparatus having fault detection means $33_1$ to $33_N$, which monitor specific items and detect faults based on criteria which are suited to the items, and which are provided in constituent elements $31_1$ to $31_N$, and further having alarm sending means $35_1$ to $35_N$ which determine the individual frequencies of occurrence of the faults detected by fault detection means $33_1$ to $33_N$ and which output alarms which indicate fixed faults related to individual items, based on the relative magnitude of the frequencies with respect to the allowable maximum fault occurrence frequencies for those items, reduces the maximum fault frequency, and expedites the completion of processing of the determination of the frequency when in the alarm sending means $35_1$ to $35_N$ the operating mode is the standby mode.

In the alarm processing apparatus having the first basic configuration, when the separately applied system configuration commands set the operating mode to the standby mode, the selection means $17_1$ to $17_N$ select the faults detected by the fault detection means $13_1$ to $13_n$, and when the operating mode is set to the non-standby mode, the selection means $17_1$ to $17_N$ select the fixed faults detected by the fixed fault detection means $15_1$ to $15_N$. Therefore, of the constituent elements $11_1$ to $11_N$, for elements operating as in-service constituent elements according to the standby redundancy system, a fixed fault alarm is obtained, which is a condition for reconfiguration of the system.

Of the constituent elements that were in the standby mode, for constituent elements removed from the standby mode in response to a system configuration command, the selection means the results of fault detection given by the fault detection means immediately after the system configuration command is given. However, because this fault detection means gives an output for one-time faults for specific items without performing integration, the system reconfiguration response and achievement of steady-state operation are done quickly. In addition, when the elapsed time from such a reconfiguration of the system exceeds the response time of the fixed fault detection means, the selection means selects the fixed fault detection results given by the fixed fault detection means, rather than the fault detection results given by the fault detection means.

That is, during the time period before which the fixed fault detection means, in response to a system reconfiguration, begins steady-state operation, in previous examples the results of fault detection are output instead of the results of the selected fixed fault detection means. Therefore, output of an alarm indicating a pseudo alarm which has not actually occurred, caused by individual operating conditions within the constituent elements in the standby mode is avoided.

In the alarm processing apparatus having the second basic configuration, the steady-state operation of the constituent elements $11_1$ to $11_N$ is the same as the alarm processing apparatus having the first basic configuration, regardless of the operating mode set for these constituent elements by the system configuration command.

Of the constituent element which were in the standby mode, for the constituent elements which were removed from the standby mode by the system configuration command, the selection means selects the results of fault detection given by the fault detection means immediately after the system configuration command is given. However, this fault detection means is restarted by the start control means. By doing this, this fault detection means does not detect faults during the transient response of the process up until reaching steady-stead operation, regardless of the individual operating conditions within the constituent elements which are in the standby mode, and further, in the steady state, output is made without integration performed with regard to one-time faults detected for specific items.

That is, because there is a great reduction in the possibility of the fault detection means detecting a fault based on the operating condition of corresponding constituent elements before reconfiguration, in comparison with the alarm processing apparatus having the first basic configuration, there is a reliable suppression of the output of alarms during the reconfiguration which actually did not occur in the system.

In the alarm processing apparatus having the third basic configuration, the fault detection means $33_1$ to $33_N$ detect faults based on pre-established criteria for specific items for each of the constituent elements $31_1$ to $31_N$, regardless of the operating mode set by means of the system configuration command. In the case in which the above-described operating mode is the standby mode, the processing expediting means $37_1$ to $37_N$ reduces the maximum frequency of occurrence of faults for each of the above-described specific items, in comparison with the case in which the operating mode is non-standby.

Therefore, of the alarm sending means $35_1$ to $35_N$, those that operate in steady state in the non-standby mode, in the same manner as for the alarm processing apparatus having the first and second basic configuration, output alarms which indicate fixed faults, according to the magnitude of the frequency of occurrence of the faults detected by the fault detection means $33_1$ to $33_N$ relative to the above-noted maximum frequency of occurrence.

For the constituent elements which are taken out of the standby mode in response to a system configuration command, because the above-described maximum frequency of occurrence is set to a small value, the processing of updating and output of alarms based on the magnitude of the frequency of occurrence relative to the maximum frequency of occurrence by the alarm sending means is completed more quickly than in the standby mode.

That is, because the alarm sending means $35_1$ to $35_N$ respond quickly to removal from the standby mode in response to a system configuration, alarms detected in response to the operating conditions of the constituent elements corresponding to the system before change in operating mode are canceled within a short period of time after the reconfiguration of the system.

Therefore, when a reconfiguration is performed, pseudo alarms in the case in which an alarm has not occurred are suppressed.

What follows is a detailed description of an embodiment of the present invention, with reference made to the drawings.

Figure 5:
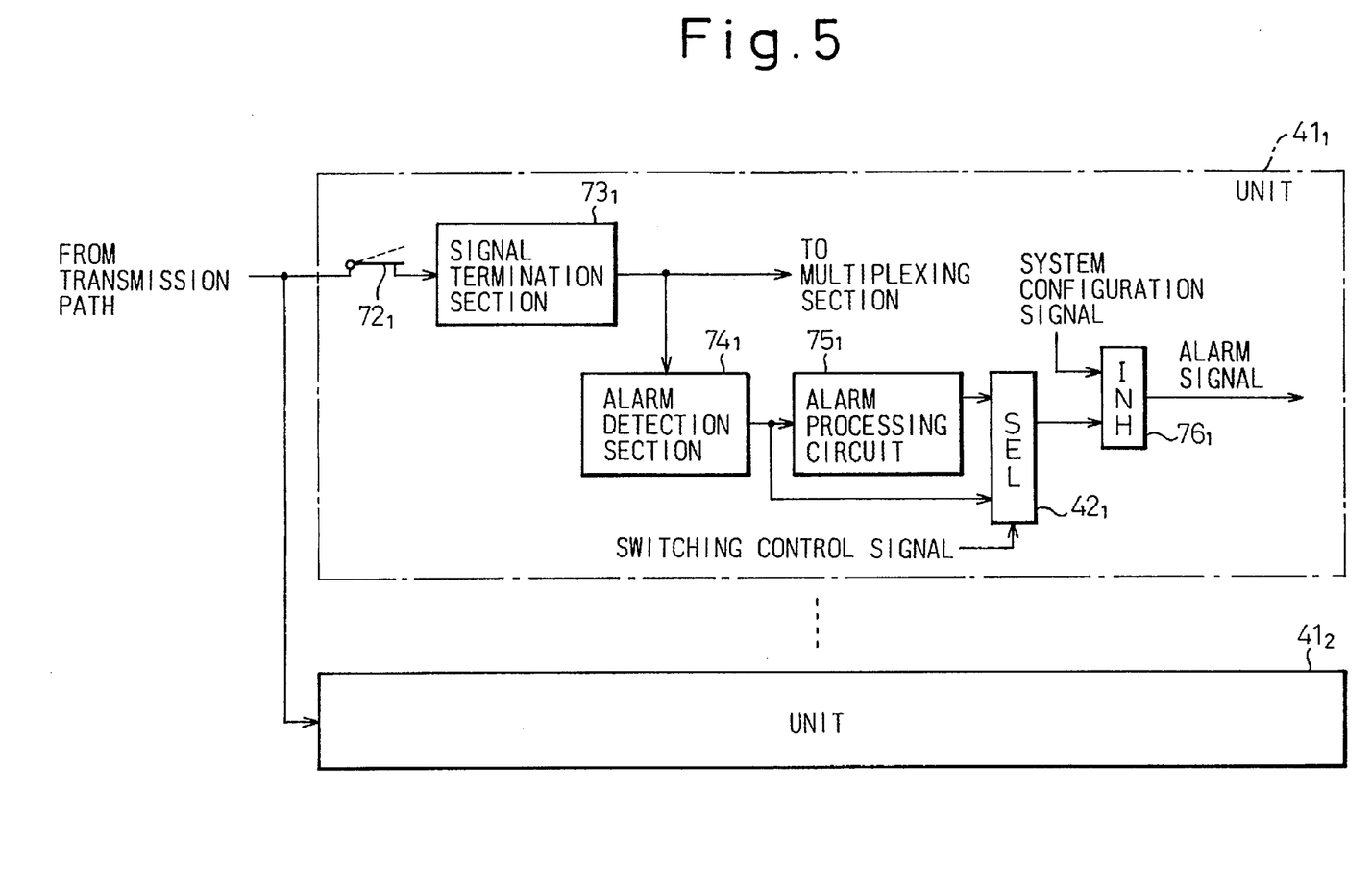
FIG. 5 is a drawing which shows an embodiment corresponding to the first basic configuration.

FIG. 5 shows an embodiment corresponding to the first basic configuration of the invention shown in FIG. 2.

In the drawing, with regard to elements of the configuration that are the same as shown in FIG. 1, the same reference numerals have been applied, and the explanations of these elements have been omitted.

This embodiment and the previous example shown in FIG. 1 differ in that in place of units $71_1$ and $71_2$, units $41_1$ and $41_2$ are provided. In unit $41_1$, the output of the alarm processing circuit $75_1$ is connected to one of the inputs of the selection circuit $42_1$, the output of that circuit being connected to an input of the inhibit circuit $76_1$. Further, the selection input of the selection circuit $42_1$ has applied to it a switching control signal which is generated by delaying the system configuration signal by a time t. Because the configuration of unit $41_2$ is the same as that of unit $41_1$, the same reference symbols, with the subscript "$_2$", have been applied to each of its constituent elements, the descriptions of which have been omitted herein.

With regard to the relationship of this embodiment to the block diagram shown in FIG. 2, units $41_1$ and $41_2$ correspond to constituent elements $11_1$ to $11_N$, signal termination sections $73_1$ and $73_2$ and alarm detection sections $74_1$ and $74_2$ correspond to fault detection means $13_1$ to $13_N$, alarm processing circuits $75_1$ and $75_2$ correspond to fixed fault detection means $15_1$ to $15_N$, and selection circuits $42_1$ and $42_2$ correspond to selection means $17_1$ to $17_N$.

The following is a description of the operation of this embodiment, with the assumptions that unit $41_1$ is operating as the in-service unit and that unit $41_2$ is in standby as a spare unit.

In unit $41_1$, selection circuit $42_1$ selects the output of alarm processing circuit $75_1$ in response to a switching control signal having the same logic value as the system configuration signal, this being applied to the inhibit circuit $76_1$. That is, in the in-service unit $41_1$, the selection circuit $42_1$ is positioned between the alarm processing circuit $75_1$ and the inhibit circuit $76_1$, although because the circuit configuration is equivalent to the prior art examples, its operational description will be omitted herein.

In unit $41_2$, selection circuit $42_2$ selects the output of alarm processing circuit $75_2$ in response to a switching control signal having the same logic value as the system configuration signal, this being applied to the inhibit circuit $76_2$. However, the output end of inhibit circuit $76_2$ is forcibly set to a logic value that indicates the condition in which a fixed fault has not occurred in response to a system configuration signal which indicates the spare unit.

The above-mentioned delay time t is set beforehand to a value that is longer than the overall response time using the system reconfiguration as the origin point, required for travel from the contacts of relay $72_2$ to the signal termination section $73_2$, via the alarm detection section $74_2$ and the alarm processing circuit $75_2$ to the output side of the selection circuit $42_2$.

When the spare unit $41_2$ is switched to be the in-service unit in response to a system reconfiguration, during the period required to reach the time t from the point of this reconfiguration, the logic value of the switching control signal is maintained at a value that is the same as the time in the standby mode. During this period, the alarm signal output from the alarm detection section $74_2$ is selected by the selection circuit $42_2$ in accordance with the condition of the transmission path connected via relay $72_2$ and signal termination section $73_2$ and the operating condition of the relay and the signal termination section, this selected signal being then output via the inhibit circuit $76_2$.

Further, when the above-described time t has elapsed, because not only does the alarm processing circuit $75_2$ operate in a steady state in response to the alarm signal output from the alarm detection section $74_2$ after the reconfiguration, but also the selection circuit $42_2$ selects the output of the alarm processing circuit $75_2$ in response to the switching control signal which changes to the same logic value as the system configuration signal, so unit $41_2$ operates in a steady state as the in-service unit.

Therefore, the time required for the logic value of the alarm signal obtained at the output side of the inhibit circuit $76_2$ in response to the system reconfiguration to become the value which indicates a fixed fault that has not actually occurred, as in the past, is less than the response time from relay $72_2$ to the output of the alarm detection section $74_2$ via the signal termination section $73_2$.

Figure 6:
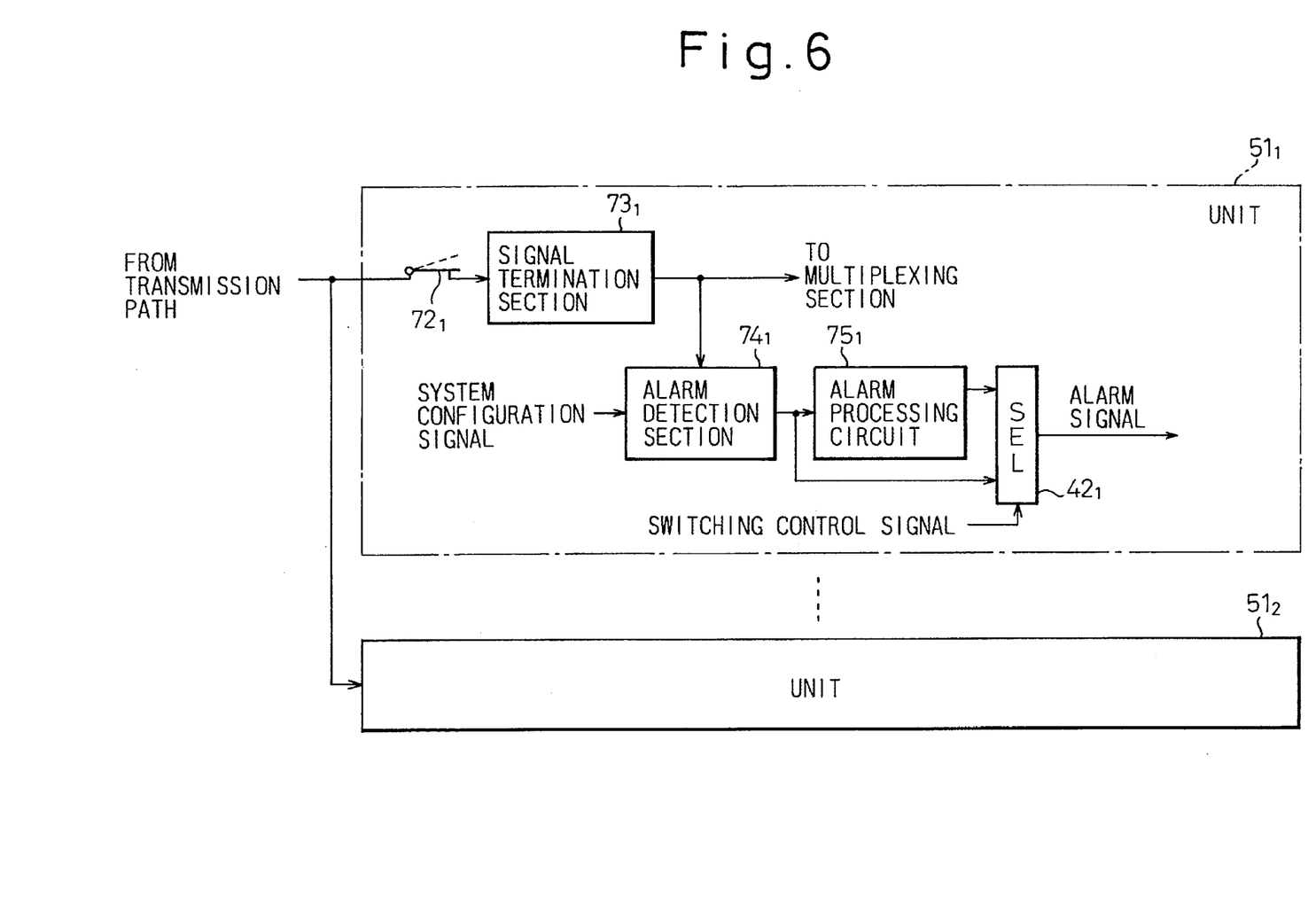
FIG. 6 is a drawing which shows an embodiment corresponding to the second basic configuration.

FIG. 6 is a drawing which shows an embodiment corresponding to the second basic configuration of the invention shown in FIG. 3.

In this drawing, functions and constituent elements which are the same as shown in FIG. 5 have been given the same reference numerals, and will not be explained herein.

The difference between this embodiment and the embodiment which is shown in FIG. 5 is the elimination of the inhibit circuits $76_1$ and $76_2$, the units $41_1$ and $41_2$ being replaced by units $51_1$ and $51_2$ in which a system configuration signal is applied to the reset inputs of the alarm detection sections $74_1$ and $74_2$.

With regard to relationship between this embodiment and the block diagram shown in FIG. 3, units $51_1$ and $51_2$ correspond to constituent elements $11_1$ to $11_N$, signal termination sections $73_1$ and $73_2$ and alarm detection sections $74_1$ and $74_2$ correspond to alarm detection means $13_1$ to $13_N$ and start control means $21_1$ to $21_N$, alarm processing circuits $75_1$ and $75_2$ correspond to fixed fault detection means $15_1$ to $15_N$, and selection circuits $42_1$ and $42_2$ correspond to selection means $17_1$ to $17_N$.

The following is a description of the operation of this embodiment, with the assumptions that unit $51_1$ is operating as the in-service unit and that unit $51_2$ is in standby as a spare unit.

In unit $51_1$, in a comparison of steady-state operation with that of the embodiment which is shown in FIG. 5, although the inhibit circuit $76_1$ is not included, because the alarm detection section $74_1$ is removed from the reset condition and operates in the steady state condition in response to the system configuration signal, the same type of alarm signal appears at the output of the selection circuit $42_1$.

At unit $51_2$, the alarm detection section $74_2$ is forcibly reset by means of the system configuration signal, the logic value at its output being set to a value corresponding to the condition in which a fault has not occurred. This logic value is the same as the logic value at the output of the inhibit circuit $76_2$ which is forcibly set in response to the system configuration signal in the embodiment which is shown in FIG. 5, and furthermore because the selection circuit $42_2$ selects an alarm signal of this logic value in response to the switching control signal, the same type of alarm signal as in the embodiment which is shown in FIG. 5 is obtained.

Furthermore, when unit $51_2$ is switched to be the in-service unit in response to a system reconfiguration, the logic value of the switching control signal is held at the same value as when the spare unit is in the standby condition. The alarm detection section $74_2$, in response to the system configuration signal, is removed from the reset condition and starts operation, the logic value of the alarm signal at the output of this section being maintained as the value corresponding to the condition in which a fixed fault has not occurred until the operating condition reaches the steady state.

Therefore, in response to the reconfiguration of the system, the logic value of the alarm signal at the output of the inhibit circuit $76_2$ does not become the value which indicates a fixed fault that has not actually occurred.

Figure 7:
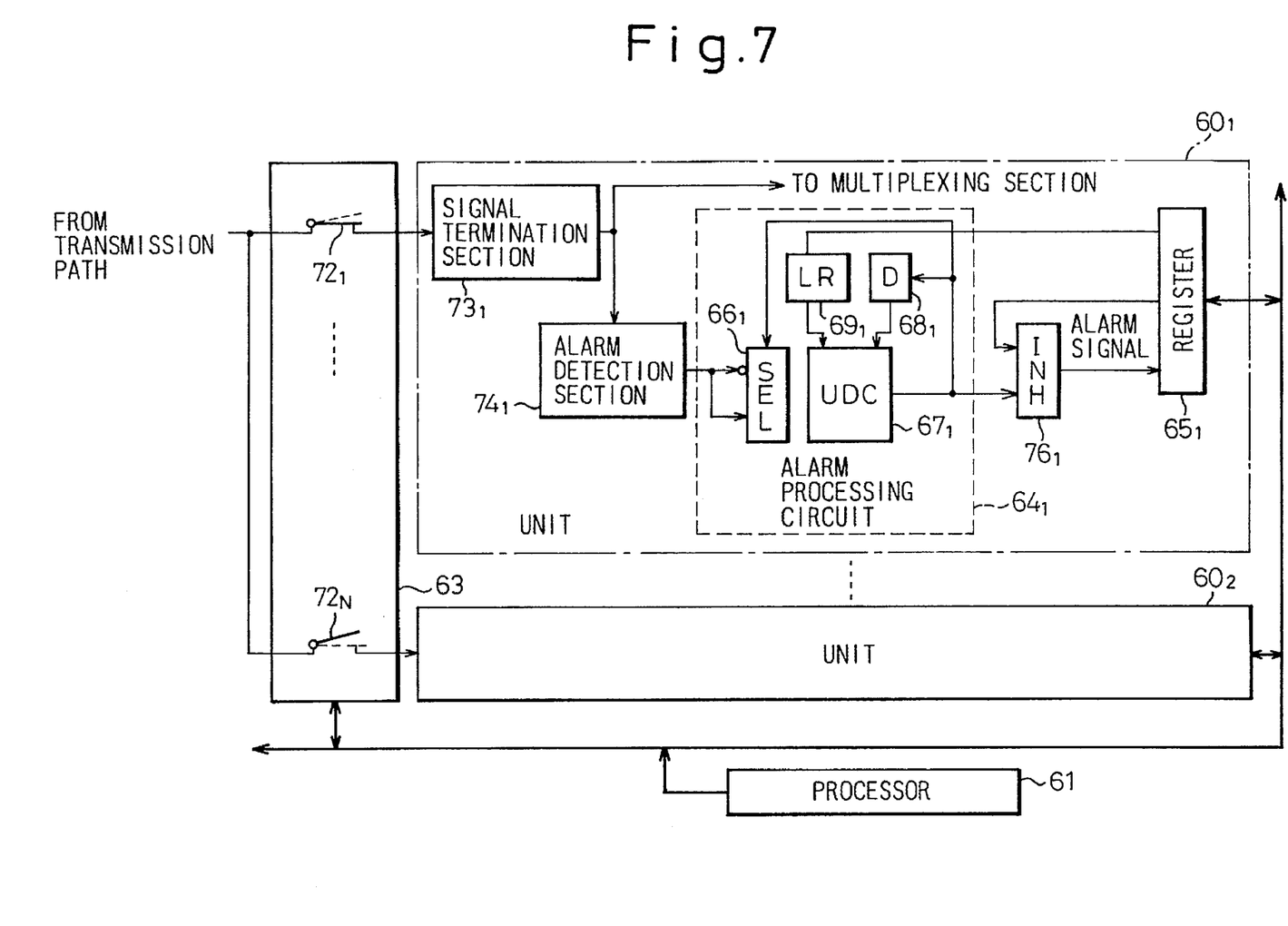
FIG. 7 is a drawing which shows an embodiment corresponding to the third basic configuration.

FIG. 7 is a drawing which shows an embodiment which corresponds to the third basic configuration of the invention shown in FIG. 4.

In this drawing, functions and constituent elements which are the same as shown in FIG. 1 have been assigned the same reference numerals, and are not explained herein.

The constitutional difference between this embodiment and the previous example show in FIG. 1 is that, in place of units $71_1$ and $71_2$, units $60_1$ and $60_2$ are provided, the relays $72_1$ and $72_2$ which were connected to the first stage of units $71_1$ an $71_2$ are grouped inside switch section 63, which is controlled by processor 61 via bus 62, and also that units $60_1$ and $60_2$ are connected to the processor via bus 62. The constitutional difference between unit $60_1$ and unit $71_1$ is the provision of alarm processing circuit $64_1$ in place of alarm processing circuit $75_1$, the system configuration bit indicating the logic value of the system configuration signal and the count value to be applied to the alarm processing circuit $64_1$ being held, and furthermore the provision of register $65_1$ to which is input the alarm signal output from inhibit circuit $76_1$. At the alarm processing circuit $64_1$, the output of the alarm detection section $74_1$ is connected to the non-inverting input and the inverting input of the selection circuit (SEL) $66_1$, the output of which is connected via an up/down counter (UDC) $67_1$ to the input of the differentiation circuit (D) $68_1$, to the selection input of the selection circuit $66_1$, and to one of the inputs of the inhibit circuit $76_1$. The output of the differentiation circuit $68_1$ is connected to the load input of the up/down counter $67_1$, to which is connected, via load register (LR) $69_1$ the output corresponding to the output of register $62_1$. With regard to configuration of the alarm processing circuit $64_2$, since this is the same configuration as the alarm processing circuit $64_1$, individual corresponding constituent elements are assigned the same reference numeral with the subscript of "$_2$" and the explanations of these have been omitted herein.

With regard to the relationship of this embodiment to the block diagram of FIG. 4, units $60_1$ and $60_2$ correspond to constituent elements $31_1$ to $31_N$, signal termination sections $73_1$ and $73_2$ and alarm detection sections $74_1$ and $74_2$ correspond to fault detection means $33_1$ and $33_N$, and alarm processing circuits $64_1$ and $64_2$ correspond to alarm sending means $35_1$ to $35_N$, processor 61, bus 62, and registers $65_1$ and $65_2$ correspond to processing expediting means $37_1$ to $37_N$.

The operation of this embodiment is described as follows. In this embodiment, the opening an closing of the contacts of relay $72_1$ and $72_2$ and the processing of system reconfiguration, which includes the generation of a system configuration signal, are performed in response to digital signals which are output via the bus 64 by the processor 64 which executes the required program. Because the operation of the various parts based on these digital signals is the same as the previous example shown in FIG. 1, it will not be explained herein.

Processor 61 tracks the condition of the dual unmanned station by means of units $60_1$ and $60_2$ and establishes the system configuration accordingly, writing into register $65_1$ which corresponds to the in-service unit $60_1$ the appropriate count value C and a system configuration bit having a logic value which indicates in-service, and writing into register $60_2$, which corresponds to the spare unit $60_2$, the count value C of "0" and the system configuration bit of a logic value indicating a spare.

At the alarm processing circuit $64_1$ of unit $60_1$, selection circuit $66_1$ captures the alarm signal output from the alarm detection section $74_1$, applying this either in inverted form or as is to the up/down counter $67_1$, depending upon the logic value of the alarm signal. The up/down counter $67_1$ counts this alarm signal, and when the count value of C is reached the logic value of the output signal is inverted. The differentiation circuit $68_1$ differentiates this output signal to generate the load signal. The up/down counter $67_1$ loads the new count value C held in register $65_1$ via load register $69_1$ in accordance with this load signal, and the selection circuit $66_1$, in response to the above-described output signal inversion, inverts the logic value of the alarm signal that is transmitted to the up/down counter $67_1$. Therefore, the output of the alarm processing circuit $64_1$ is an alarm signal that is integrated with a time constant corresponding to the above-described count value C.

At the alarm processing circuit $64_2$ of unit $60_2$, at the output of the inhibit circuit $76_2$ an alarm signal is obtained which indicates that a fixed fault has not occurred by means of the system configuration signal given by the system configuration bit held in register $65_2$. In addition, at the alarm processing circuit $64_2$, in the same manner as for the above-described alarm processing circuit $64_1$, integration is performed of the alarm signal output from the alarm detection section $74_2$. However, because the count value C has been set to "0", the output of the up/down counter $67_2$ is inverted in response to the rising edge and falling edge of the alarm signal from the alarm detection section $74_2$, this being applied to the inhibit circuit $76_2$ without being integrated.

Under such conditions, in response to the reconfiguration of the system, when unit $60_2$ replaces unit $60_1$ as the in-service unit, the count value C (0) and a system configuration bit having a logic value which indicates in-service are written into register $65_2$. The alarm processing circuit $64_2$, in response to the open condition of the contacts of relay $72_2$, which had been opened before the reconfiguration of the system, captures the alarm signal which is output from the alarm detection section $74_2$, with output of the alarm signal being made without any integration processing, so that quick response to the system reconfiguration and achievement of steady-state operation are achieved.

Therefore, in response to a system reconfiguration, the logic value of the alarm signal obtained at the output of the inhibit circuit $76_2$ is reset quickly from the logic value that indicates a fixed fault that has not actually occurred.

In each of the above-described embodiments, although the alarm processing circuits are separate dual units, the present invention is not limited to dual units, and can applied to units having a redundancy of n+1 spares, according to the standby redundancy system.

The present invention can also be applied in the same manner to the case in which a plurality of units are provided to achieve load distribution, and in which a feedback system is used to continue operation by means of a degenerate configuration in which a decrease in functioning and performance is allowed when a fault occurs.

In addition, in each of the above-described embodiments, although the individual units are provided with correspondence to transmission paths, with an alarm detection section which makes a judgment as to the existence or non-existence of a fault based on the transmission method of the transmission paths, the present invention is not limited to such units, and if the spare unit includes a circuit which detects the occurrence of a fixed fault of no actual substance occurring during the standby condition for some reason after a system reconfiguration, it is possible to apply the present invention to units which are installed in devices and systems other than those for transmission, regardless of the type of fault and detection system.

In each of the above-described embodiments, although a fault processing circuit which includes an up/down counter (integration means) for the purpose of determining the frequency of occurrence of faults, the present invention is not limited to a fault processing circuit, if it is possible to distinguish between one-time or dispersed faults and fixed faults, it is possible to perform integration of the number of occurrences of faults by means of the time axis moving average method, exponential smoothing method or any other method.

In addition, although in each of the above-described embodiments the alarm processing circuit 75, inhibit circuit 76, and selection circuit 42 are implemented with dedicated hardware, the present invention is not limited to this configuration, and can be implemented in part or in whole by means of software.

In the present invention as described above, in a constituent element which has left the standby mode by means of a system reconfiguration, during the period until the means of detecting a fixed fault based on the frequency of occurrence of one-time faults detected by a fault detection means reaches the steady state condition, in place of an alarm that indicates the existence or non-existence of that fixed fault, results of the detection by the fault detection means are used and the fault detection means are restarted along with the reconfiguration of the system, thereby suppressing alarms and the effective time of such alarms that are output despite the fact that there is no actual alarm caused by the operation condition in each part of the system in the standby mode.

Therefore, in a system which includes a plurality of constituent elements to which the present invention is applied, since recovery is based on standby redundancy, recovery from faults is reliable and quick, thereby achieving high system reliability.

What is claimed is:

1. An alarm processing apparatus comprising:

fault detection means for monitoring specific items in a system and for detecting faults in the items, said fault detection means being provided in constituent elements of said system, said constituent elements having standby redundancy with respect to each other and said constituent elements having an operating mode which is set in accordance with a system configuration command based on said standby redundancy;

fixed fault detection means for determining individual frequencies of occurrence of said faults detected by said fault detection means and for detecting fixed faults related respectively to said items, based on a relative magnitude of frequencies with respect to allowable maximum fault occurrence frequencies for said items; and selection means for receiving outputs from both of said detection means and for outputting, by means of said system configuration command and at a timing which is delayed longer than a response time of said fixed fault detection means, an alarm for one of the faults detected by the fault detection means in response to the system configuration command and the fixed faults detected by said fixed fault detection means;

start control means for performing individual monitoring of operating modes of the constituent elements based on said system configuration command, and for performing a restart of the fault detection means when this operating mode switches to a non-standby mode.

2. An alarm processing apparatus comprising:

fault detection means for monitoring specific items in a system and for detecting faults in the items, said fault detection means being provided individually to constituent elements having standby redundancy with respect to each other, an operating mode of said constituent elements being set in response to a system configuration command based on said redundancy; and alarm sending means for determining individual frequencies of occurrence of the faults detected by said fault detection means and for outputting alarms which indicate fixed faults related respectively to said items, and based on a relative magnitude of frequencies of occurrence with respect to allowable maximum fault occurrence frequencies for said items, reduces the maximum fault occurrence frequency, wherein said alarm sending means being provided with processing expediting means whereby said maximum fault occurrence frequencies are individually reduced when the operating mode set by said system configuration command is in a standby mode, and further whereby a completion is expedited of said determination of frequency of occurrence.

* * * * *